US012762195B2

(12) United States Patent
Ma et al.

(10) Patent No.: US 12,762,195 B2
(45) Date of Patent: Oct. 13, 2026

(54) RANKING CANDIDATE SEARCH RESULTS BY ACTIVENESS

(71) Applicant: Microsoft Technology Licensing, LLC, Redmond, WA (US)

(72) Inventors: Rui Ma, Santa Clara, CA (US); Keheng Zhang, Belmont, CA (US); Yongqing Yuan, Mountain View, CA (US); Baolu Shen, Santa Clara, CA (US); Kefang Ning, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 32 days.

(21) Appl. No.: 19/008,789

(22) Filed: Jan. 3, 2025

(65) Prior Publication Data

US 2025/0139182 A1 May 1, 2025

Related U.S. Application Data

(63) Continuation of application No. 16/367,753, filed on Mar. 28, 2019, now Pat. No. 12,223,001.

(51) Int. Cl.

| | |
|---|---|
| ***G06F 7/00*** | (2006.01) |
| ***G06F 16/903*** | (2019.01) |
| ***G06F 16/9536*** | (2019.01) |
| ***G06F 16/9538*** | (2019.01) |
| ***G06N 20/00*** | (2019.01) |
| ***G06Q 10/40*** | (2026.01) |

(52) U.S. Cl.
CPC .... *G06F 16/9536* (2019.01); *G06F 16/90335* (2019.01); *G06F 16/9538* (2019.01); *G06N 20/00* (2019.01); *G06Q 10/40* (2026.01)

(58) Field of Classification Search
USPC .......................................................... 707/725
See application file for complete search history.

(56) References Cited

U.S. PATENT DOCUMENTS

| | | | | |
|---|---|---|---|---|
| 10,684,738 B1 * | 6/2020 | Sicora | G06F 3/04817 | |
| 2010/0262612 A1 * | 10/2010 | El-Saban | G06F 16/951 | 707/E17.015 |
| 2016/0063442 A1 * | 3/2016 | Bennett | G06Q 10/1053 | 705/319 |

OTHER PUBLICATIONS

Hong et al. IHR: An Online Recruiting System for Xiamen Talent Service Center. KDD'13, pp. 1177-1185. (Year: 2013).*

(Continued)

*Primary Examiner* — Isaac M Woo
(74) *Attorney, Agent, or Firm* — KDW Firm PLLC

(57) ABSTRACT

The disclosed embodiments provide a system for processing data. During operation, the system determines activity features for candidates that match parameters of a search from a moderator of an opportunity, wherein the activity features include an amount of interaction between a candidate and additional moderators and a frequency of visits by the candidate to a platform used to conduct the interaction between the candidate and the additional moderators. Next, the system applies a machine learning model to the activity features to produce activeness scores representing levels of activity of the candidates with respect to the platform. The system then generates a ranking of the candidates according to the activeness scores. Finally, the system outputs at least a portion of the ranking as a set of search results of the search.

20 Claims, 4 Drawing Sheets

(56) References Cited

OTHER PUBLICATIONS

Horincar et al. Online refresh strategies for content based feed aggregation. WWW 2015, 18:913-047. (Year: 2015).*
Lu et al. A Recommender System for Job Seeking and Recruiting Website. WWW 2013 Companion, pp. 963-966. (Year: 2013).*

* cited by examiner

RANKING CANDIDATE SEARCH RESULTS BY ACTIVENESS

CROSS-REFERENCE TO RELATED APPLICATION

This application is a continuation of and claims priority to U.S. patent application Ser. No. 16/367,753, filed on Mar. 28, 2019, entitled "RANKING CANDIDATE SEARCH RESULTS BY ACTIVENESS", which is hereby incorporated by reference in its entirety.

BACKGROUND

Field

The disclosed embodiments relate to techniques for ranking search results. More specifically, the disclosed embodiments relate to techniques for ranking candidate search results by activeness.

Related Art

Online networks commonly include nodes representing individuals and/or organizations, along with links between pairs of nodes that represent different types and/or levels of social familiarity between the entities represented by the nodes. For example, two nodes in an online network may be connected as friends, acquaintances, family members, classmates, and/or professional contacts. Online networks may further be tracked and/or maintained on web-based networking services, such as online networks that allow the individuals and/or organizations to establish and maintain professional connections, list work and community experience, endorse and/or recommend one another, promote products and/or services, and/or search and apply for jobs.

In turn, online networks may facilitate activities related to business, recruiting, networking, professional growth, and/or career development. For example, professionals may use an online network to locate prospects, maintain a professional image, establish and maintain relationships, and/or engage with other individuals and organizations. Similarly, recruiters may use the online network to search for candidates for job opportunities and/or open positions. At the same time, job seekers may use the online network to enhance their professional reputations, conduct job searches, reach out to connections for job opportunities, and apply to job listings. Consequently, use of online networks may be increased by improving the data and features that can be accessed through the online networks.

BRIEF DESCRIPTION OF THE FIGURES

In the figures, like reference numerals refer to the same figure elements.

DETAILED DESCRIPTION

Figure 1:
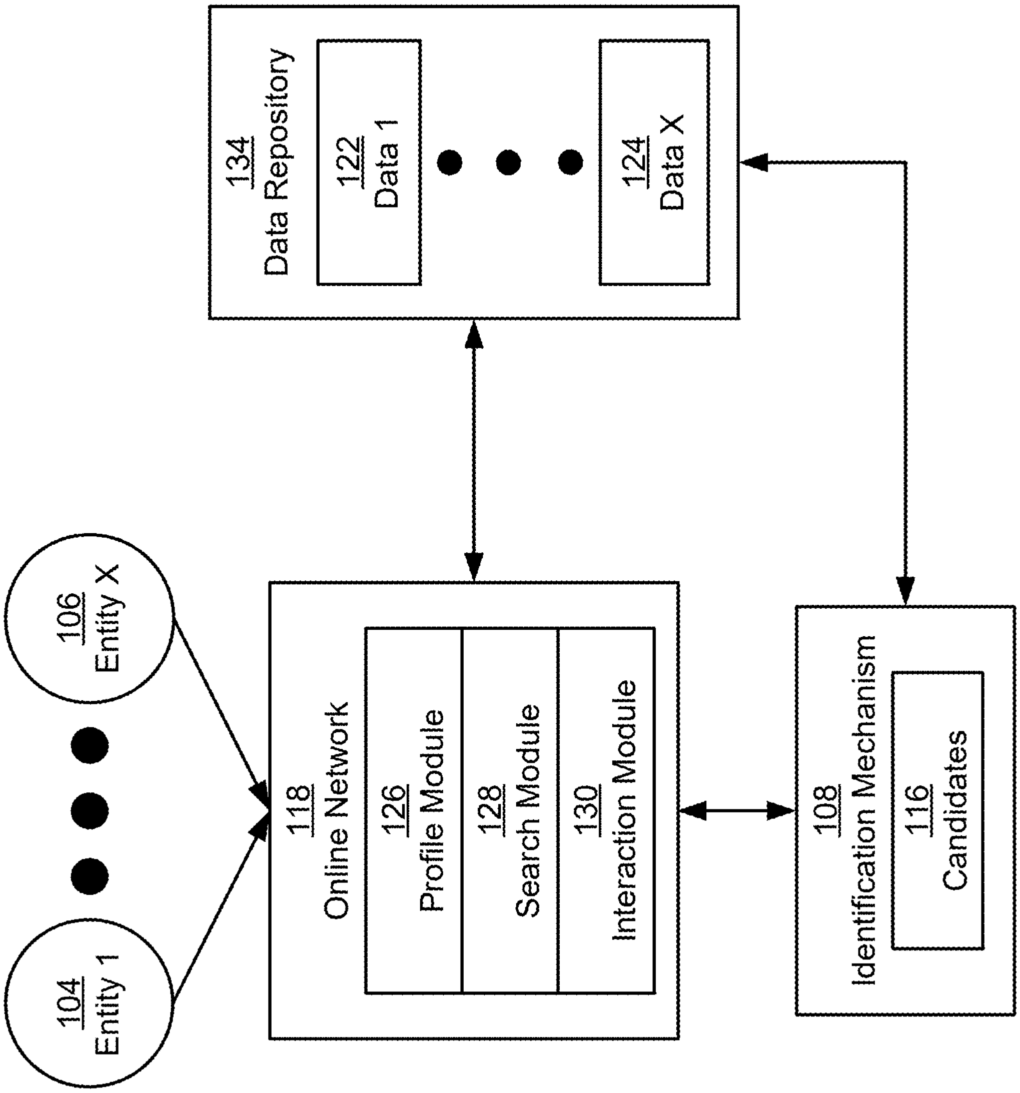
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for ranking candidate search results. For example, the rankings may include rankings of candidates for jobs, positions, roles, and/or other opportunities. The rankings may also, or instead, include rankings of recommendations of connections, follows, mentorships, referrals, online dating matches, and/or other types of relationships or interactions for members of an online network. Each ranking may be produced by ordering the candidates by descending score from one or more machine learning models. As a result, candidates at or near the top of a ranking may be deemed to be better qualified for the corresponding opportunity and/or recommendation than candidates that are lower in the ranking.

More specifically, the disclosed embodiments include functionality to rank candidates in search results based on the activeness (i.e., level of activity) of each candidate on a platform associated with job-seeking, recruiting, hiring, employment, and/or other activity related to placement of candidates with opportunities. For example, the candidates may interact with jobs and/or recruiters through an online network, employment website, job search tool, and/or another type of client-server application. Each candidate's activity or engagement with the application may be characterized and/or measured using a number of features, such as a "job seeker score" that classifies the candidate's level of job-seeking interest, a number of messages sent or received between the candidate and recruiters, and/or the candidate's frequency of use of the application. The features may be inputted into a machine learning model to produce an activeness score representing the candidate's overall activity level with the application. In turn, a recruiter searching for candidates that match the qualifications of a given job may have the option of viewing a ranking of the candidates by activeness score, in lieu of or in addition to viewing a ranking of the candidates by relevance and/or compatibility with the job.

By generating scores that characterize the level of activity and/or responsiveness of candidates to moderators of opportunities and delivering search results and/or rankings of the candidates based on the scores, the disclosed embodiments allow the moderators to identify and engage with active and/or interested candidates instead of dormant and/or uninterested candidates. In turn, the disclosed embodiments may expedite the moderators' search for candidates for open jobs/opportunities and/or improve job-seeking for candidates. In contrast, conventional techniques may generate rankings and/or search results of candidates without considering the candidates' level of job-seeking activity or interest. Instead, the moderators may be matched to candidates that are inactive and/or candidates that are not interested in new opportunities. Thus, the moderators may experience additional overhead and a suboptimal user experience, since inactive or disinterested candidates are unlikely to respond to efforts by the moderators to notify the candidates about opportunities. At the same time, the candidates may also have suboptimal user experiences in receiving communications regarding opportunities when the candidates aren't interested in new opportunities. Consequently, the disclosed embodiments may improve computer systems, applications, user experiences, tools, and/or technologies related to generating search results, user recommendations, employment, recruiting, and/or hiring.

Ranking Candidate Search Results by Activeness

FIG. 1 shows a schematic of a system in accordance with the disclosed embodiments. As shown in FIG. 1, the system may include an online network 118 and/or other user community. For example, online network 118 may include an online professional network that is used by a set of entities (e.g., entity 1 104, entity x 106) to interact with one another in a professional and/or business context.

The entities may include users that use online network 118 to establish and maintain professional connections, list work and community experience, endorse and/or recommend one another, search and apply for jobs, and/or perform other actions. The entities may also include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 may also allow the entities to view the profiles of other entities in online network 118.

Profile module 126 may also include mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 may be tracked and stored in a database, data warehouse, cloud storage, and/or other data-storage mechanism providing data repository 134.

Data in data repository 134 may then be used to generate recommendations and/or other insights related to listings of jobs or opportunities within online network 118. For example, one or more components of online network 118 may track searches, clicks, views, text input, conversions, and/or other feedback during the entities' interaction with a job search tool in online network 118. The feedback may be stored in data repository 134 and used as training data for one or more machine learning models, and the output of the machine learning model(s) may be used to display and/or otherwise recommend a number of job listings to current or potential job seekers in online network 118.

More specifically, data in data repository 134 and one or more machine learning models are used to produce rankings of candidates associated with jobs or opportunities listed within or outside online network 118. As shown in FIG. 1, an identification mechanism 108 identifies candidates 116 associated with the opportunities. For example, identification mechanism 108 may identify candidates 116 as users who have viewed, searched for, and/or applied to jobs, positions, roles, and/or opportunities, within or outside online network 118. Identification mechanism 108 may also, or instead, identify candidates 116 as users and/or members of online network 118 with skills, work experience, and/or other attributes or qualifications that match the corresponding jobs, positions, roles, and/or opportunities.

After candidates 116 are identified, profile and/or activity data of candidates 116 may be inputted into the machine learning model(s), along with features and/or characteristics of the corresponding opportunities (e.g., required or desired skills, education, experience, industry, title, etc.). In turn, the machine learning model(s) may output scores representing the strengths of candidates 116 with respect to the opportunities and/or qualifications related to the opportunities (e.g., skills, current position, previous positions, overall qualifications, etc.). For example, the machine learning model(s) may generate scores based on similarities between the candidates' profile data with online network 118 and descriptions of the opportunities. The model(s) may further adjust the scores based on social and/or other validation of the candidates' profile data (e.g., endorsements of skills, recommendations, accomplishments, awards, patents, publications, reputation scores, etc.). The rankings may then be generated by ordering candidates 116 by descending score.

In turn, rankings based on the scores and/or associated insights may improve the quality of candidates 116, recommendations of opportunities to candidates 116, and/or recommendations of candidates 116 for opportunities. Such rankings may also, or instead, increase user activity with online network 118 and/or guide the decisions of candidates 116 and/or moderators involved in screening for or placing the opportunities (e.g., hiring managers, recruiters, human resources professionals, etc.). For example, one or more components of online network 118 may display and/or otherwise output a member's position (e.g., top 10%, top 20 out of 138, etc.) in a ranking of candidates for a job to encourage the member to apply for jobs in which the member is highly ranked. In a second example, the component(s) may account for a candidate's relative position in rankings for a set of jobs during ordering of the jobs as search results in response to a job search by the candidate. In a third example, the component(s) may output a ranking of candidates for a given set of job qualifications as search results to a recruiter after the recruiter performs a search with the job qualifications included as parameters of the search. In a fourth example, the component(s) may recommend jobs to a candidate based on the predicted relevance or attractiveness of the jobs to the candidate and/or the candidate's likelihood of applying to the jobs.

On the other hand, candidates 116 in search results, rankings, and/or recommendations outputted to moderators may vary in level of interest, responsiveness, and/or "activeness" in seeking jobs and/or other opportunities. For example, a recruiter may search for candidates 116 that match the requirements of a job. In response to the search, online network 118 may generate relevance scores between profile attributes of candidates 116 and the requirements, rank candidates 116 by decreasing relevance score, and output the ranked candidates 116 as search results of the search. As a result, some candidates 116 in the search results may be uninterested in new jobs or opportunities, infrequent or dormant users of online network 118, and/or otherwise unresponsive or slow to respond to communications related to the jobs or opportunities from the moderators.

In turn, candidates 116 that are unresponsive or less responsive to opportunities and/or contact from the moderators may result in suboptimal user experiences for both the moderators and candidates 116. For example, a recruiter may reach out to a candidate about a job based on the candidate's appearance in search results for a search conducted by the recruiter. If the candidate is inactive or not interested in finding a new job, the recruiter may fail to receive a response from the candidate. Instead, the recruiter may put forth additional effort to search for and/or contact additional candidates 116 that are interested in or receptive to the job. In another example, a member of online network 118 that is not interested in changing jobs may appear in search results that are outputted to recruiters looking for candidates 116 that are similar to the member. In turn, the member may receive a number of unwanted messages from the recruiters through interaction module 130, which may reduce the value of online network 118 to the member and/or discourage the member from using online network 118.

Figure 2:
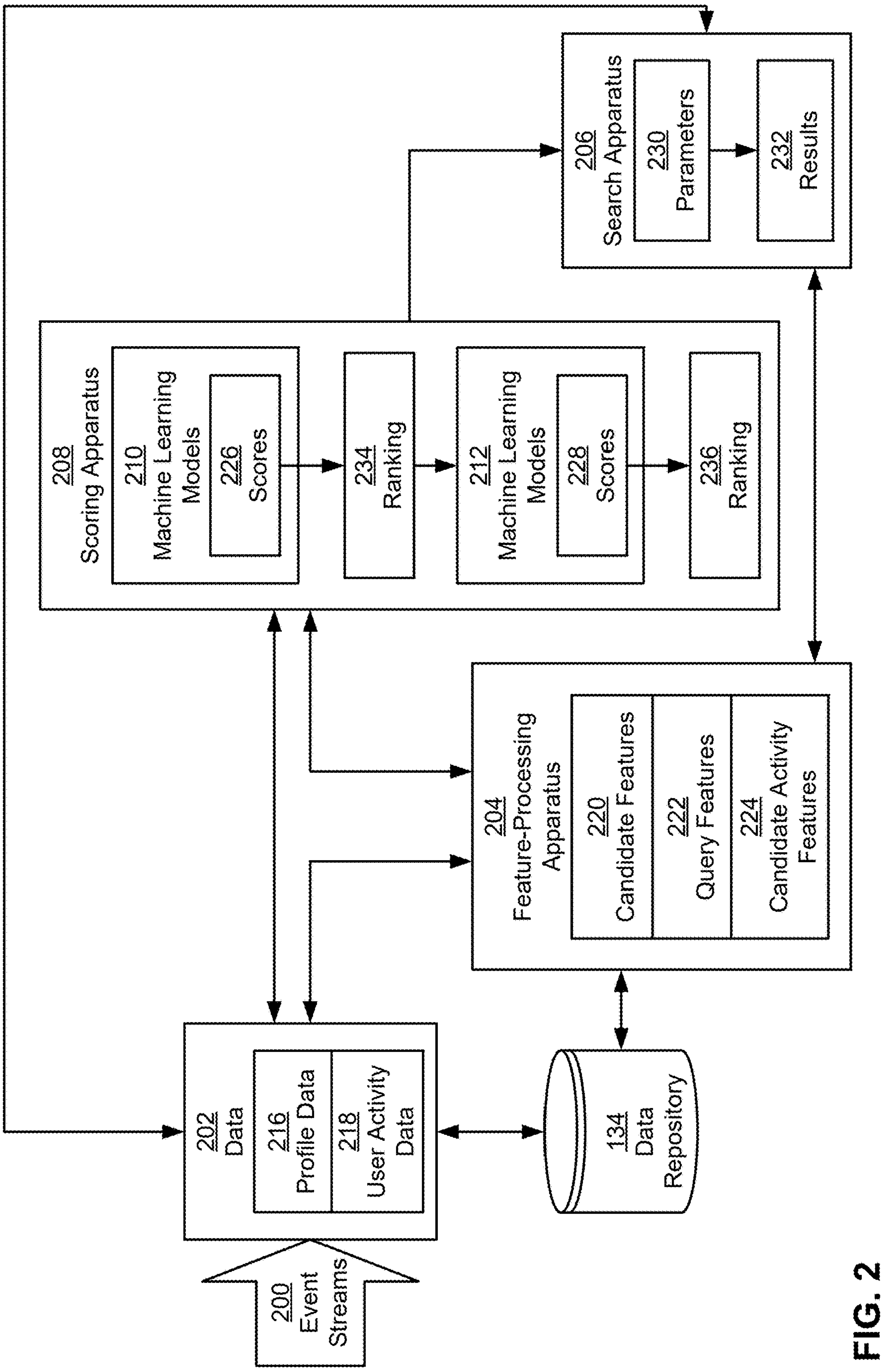
FIG. 2 shows a system for processing data in accordance with the disclosed embodiments.

In one or more embodiments, online network 118 includes functionality to improve rankings and/or recommendations related to candidates 116 for opportunities by generating the rankings and/or recommendations based on the "activeness" of candidates 116 in engaging with online network 118 and/or moderators of the opportunities. As shown in FIG. 2, data 202 from data repository 134 is used to generate rankings 234-236 of candidates in response to parameters 230 of searches by moderators of opportunities. Data 202 includes profile data 216 for members of an online platform (e.g., online network 118 of FIG. 1), as well as user activity data 218 that tracks the members' and/or candidates' activity within and/or outside the platform.

Profile data 216 includes data associated with member profiles in the platform. For example, profile data 216 for an online professional network may include a set of attributes for each user, such as demographic (e.g., gender, age range, nationality, location, language), professional (e.g., job title, professional summary, professional headline, employer, industry, experience, skills, seniority level, professional endorsements), social (e.g., organizations to which the user belongs, geographic area of residence), and/or educational (e.g., degree, university attended, certifications, licenses) attributes. Profile data 216 may also include a set of groups to which the user belongs, the user's contacts and/or connections, awards or honors earned by the user, licenses or certifications attained by the user, patents or publications associated with the user, and/or other data related to the user's interaction with the platform.

Attributes of the members may be matched to a number of member segments, with each member segment containing a group of members that share one or more common attributes. For example, member segments in the platform may be defined to include members with the same industry, title, location, and/or language.

Connection information in profile data 216 may additionally be combined into a graph, with nodes in the graph representing entities (e.g., users, schools, companies, locations, etc.) in the platform. Edges between the nodes in the graph may represent relationships between the corresponding entities, such as connections between pairs of members, education of members at schools, employment of members at companies, following of a member or company by another member, business relationships and/or partnerships between organizations, and/or residence of members at locations.

User activity data 218 includes records of user interactions with one another and/or content associated with the platform. For example, user activity data 218 may be used to track impressions, clicks, likes, dislikes, shares, hides, comments, posts, updates, conversions, and/or other user interaction with content in the platform. User activity data 218 may also, or instead, track other types of activity, including connections, messages, job applications, job searches, recruiter searches for candidates, interaction between candidates 116 and recruiters, and/or interaction with groups or events. User activity data 218 may further include social validations of skills, seniorities, job titles, and/or other profile attributes, such as endorsements, recommendations, ratings, reviews, collaborations, discussions, articles, posts, comments, shares, and/or other member-to-member interactions that are relevant to the profile attributes. User activity data 218 may additionally include schedules, calendars, and/or upcoming availabilities of the users, which may be used to schedule meetings, interviews, and/or events for the users. Like profile data 216, user activity data 218 may be used to create a graph, with nodes in the graph representing members and/or content and edges between pairs of nodes indicating actions taken by members, such as creating or sharing articles or posts, sending messages, sending or accepting connection requests, endorsing or recommending one another, writing reviews, applying to opportunities, joining groups, and/or following other entities.

Profile data 216, user activity data 218, and/or other data 202 in data repository 134 may be standardized before the data is used by components of the system. For example, skills in profile data 216 may be organized into a hierarchical taxonomy that is stored in data repository 134 and/or another repository. The taxonomy may model relationships between skills (e.g., "Java programming" is related to or a subset of "software engineering") and/or standardize identical or highly related skills (e.g., "Java programming," "Java development," "Android development," and "Java programming language" are standardized to "Java"). In another example, locations in data repository 134 may include cities, metropolitan areas, states, countries, continents, and/or other standardized geographical regions. In a third example, data repository 134 includes standardized company names for a set of known and/or verified companies associated with the members and/or jobs. In a fourth example, data repository 134 includes standardized titles, seniorities, and/or industries for various jobs, members, and/or companies in the online network. In a fifth example, data repository 134 includes standardized time periods (e.g., daily, weekly, monthly, quarterly, yearly, etc.) that can be used to retrieve profile data 216, user activity data 218, and/or other data 202 that is represented by the time periods (e.g., starting a job in a given month or year, graduating from university within a five-year span, job listings posted within a two-week period, etc.). In a sixth example, data repository 134 includes standardized job functions such as "accounting," "consulting," "education," "engineering," "finance," "healthcare services," "information technology," "legal," "operations," "real estate," "research," and/or "sales."

Data 202 in data repository 134 may further be updated using records of recent activity received over one or more event streams 200. For example, event streams 200 may be generated and/or maintained using a distributed streaming platform such as Apache Kafka (Kafka™ is a registered trademark of the Apache Software Foundation). One or more event streams 200 may also, or instead, be provided by a change data capture (CDC) pipeline that propagates changes to data 202 from a source of truth for data 202. For example, an event containing a record of a recent profile update, job search, job view, job application, response to a job application, connection invitation, post, like, comment, share, and/or other recent member activity within or outside the platform may be generated in response to the activity. The record may then be propagated to components subscribing to event streams 200 on a nearline basis.

A search apparatus 206 uses data 202 in data repository 134 to identify candidates (e.g., candidates 116 of FIG. 1) that match parameters 230 of a search. For example, search apparatus 206 may be provided by a recruiting module or tool that is associated with and/or provided by the platform. Search apparatus 206 may include checkboxes, radio buttons, drop-down menus, text boxes, and/or other user-interface elements that allow a recruiter and/or another moderator involved in hiring for or placing jobs or opportunities to specify parameters 230 related to candidates for an opportunity and/or a number of related opportunities.

Parameters 230 include attributes that are desired or required by the position(s). For example, parameters 230 may include thresholds, values, and/or ranges of values for an industry, location, education, skills, past positions, current positions, seniority, overall qualifications, title, seniority, keywords, awards, publications, patents, licenses and certifications, and/or other attributes or fields associated with profile data 216 for the candidates.

Search apparatus 206 and/or another component may query data repository 134 for profile data 216 that matches parameters 230. In response to the query, data repository 134 may return member identifiers and/or profile data 216 of candidates that match parameters 230. For example, data repository 134 may identify thousands to tens of thousands of candidates with profile attributes that meet or fit the criteria specified in parameters 230.

To improve the quality and/or relevance of search results 232 for a given set of search parameters 230, candidates that meet the criteria represented by parameters 230 are ordered in search results 232 based on features associated with the candidates and/or the recruiter performing the search. As shown in FIG. 2, a feature-processing apparatus 204 calculates the features using data 202 from data repository 134. Such calculations may occur on an offline, periodic, or batch-processing basis to produce features for a large number of candidates. Some or all features may also, or instead, be generated in an online, nearline, and/or on-demand basis based on recent search parameters (e.g., parameters 230) by recruiters and/or other users interacting with search apparatus 206.

In one or more embodiments, features used to produce results 232 include candidate features 220, query features 222, and/or candidate activity features 224. Candidate features 220 may include features related to each candidate's compatibility with parameters 230. For example, candidate features 220 may include each candidate's name, school, title, seniority, employment history, skills, recommendations, endorsements, awards, honors, publications, and/or other attributes that relate, directly or indirectly, to search parameters 230 inputted by the recruiter. Candidate features 220 may also, or instead, include match scores between parameters 230 and the candidate's corresponding attributes (e.g., industry, location, skills, seniority, etc.), reputation scores for skills specified in parameters 230, and/or other measures of the candidate's qualifications compared with the corresponding criteria in parameters 230.

Query features 222 characterize a given query. For example, query features 222 may include representations of parameters of the query and/or a context of the query (e.g., a tool, module, platform, application, device, and/or location from which the query was performed).

Candidate activity features 224 represent the job-seeking behavior, activity level, and/or preferences of each candidate. For example, candidate activity features 224 may include a job-seeker score that classifies a candidate's job-seeking status as a job seeker or non-job-seeker and/or estimates the candidate's level of job-seeking interest. In another example, candidate activity features 224 may include the amount of time since a candidate has expressed openness or availability for new opportunities (e.g., as a profile setting and/or job search setting) and/or the candidate's openness to the new opportunities. In a third example, candidate activity features 224 may include views, searches, applications, and/or other activity of a candidate with job postings and/or views or searches of company-specific pages in the platform.

Candidate activity features 224 may also, or instead, include measures of the candidate's popularity with recruiters (and/or other moderators of opportunities) and/or the candidate's willingness to interact with recruiters. For example, candidate activity features 224 may include the number of messages sent to the candidate by recruiters, the number of recruiter messages accepted by the candidate (e.g., as indicated by the candidate responding to the messages and/or selecting a user-interface element indicating interest in the messages), a percentage of messages accepted by the candidate, message delivery settings of the candidate, and/or the number of times the candidate has been viewed in search results (e.g., results 232) by recruiters.

Candidate activity features 224 may also, or instead, indicate the candidate's level of activity with the platform. For example, candidate activity features 224 may include a categorical feature that represents the candidate's number of visits to the platform over a given period (e.g., at least four times a week over a four-week period, at least once a week over a four-week period, at least once over a four-week period, and/or zero times over the four-week period). In another example, candidate activity features 224 may include a Boolean feature that indicates the candidate's online status with the platform (i.e., whether or not the candidate is currently logged in to and/or using the platform).

In one or more embodiments, some or all candidate features 220, query features 222, and/or candidate activity features 224 are calculated from profile data 216 and/or user activity data 218 that is collected over a configurable time window. For example, features that relate to job-seeking or hiring activities by recruiters and candidates and/or interaction between recruiters and candidates may be calculated over a 30-day sliding window. As a result, the sliding window may represent the "memory" of the system with respect to recent impressions, interactions, profile updates, and/or other activity involving the recruiter and/or candidates. The features may also, or instead, be recalculated over a different configurable period (e.g., every seven days) to prevent scores 226-228, rankings 234-236, and results 232 produced from the features from changing too frequently.

In turn, features from feature-processing apparatus 204 may be used to order candidates in search results 232 that are returned in response to search parameters 230 from a given moderator based on the relevance of the candidates to parameters 230, the activeness of the candidates in interacting with moderators and/or the platform, and/or other criteria. More specifically, a scoring apparatus 208 inputs candidate features 220, query features 222, and/or candidate activity features 224 into one or more machine learning models 210-212 to generate one or more sets of scores 226-228 for the candidates. Each set of scores 226-228 is then used to produce a corresponding ranking (e.g., rankings 234-236) of the candidates, and one or more rankings are used to populate search results 232 that are returned in response to a set of search parameters 230.

For example, machine learning models 210-212 may include decision trees, random forests, gradient boosted trees, regression models, neural networks, deep learning models, ensemble models, and/or other types of models that generate multiple rounds of scores 226-228 and/or rankings 234-236 for the candidates according to different sets of criteria and/or thresholds. Each score generated by a given machine learning model may represent the likelihood of a positive outcome between the candidate and recruiter (e.g., the candidate accepting a message from the recruiter, given an impression of the candidate by the recruiter in search results 232; the recruiter responding to the candidate's job application; hiring of the candidate for the job; etc.). Thus, an improvement in the performance and/or precision of each machine learning model may produce a corresponding increase in the rate of positive outcomes after the candidates are viewed by recruiters in search results 232.

In one or more embodiments, scoring apparatus 208 uses one or more machine learning models 210 to generate a first set of scores 226 from candidate features 220, query features 222, and/or candidate activity features 224 for all candidates that match parameters 230 (e.g., all candidates returned by data repository 134 in response to a query containing parameters 230). Scoring apparatus 208 may also generate ranking 234 by ordering the candidates by descending score from the first set of scores 226.

Next, scoring apparatus 208 may obtain a highest-ranked subset of candidates from ranking 234 (e.g., the top 1,000 candidates in ranking 234) and input additional candidate features 220, query features 222, and/or candidate activity features 224 for the highest-ranked subset of candidates into one or more additional machine learning models 212. Scoring apparatus 208 may then obtain a second set of scores 228 from machine learning models 212 and generate ranking 236 by ordering the subset of candidates by descending score from the second set of scores 228. As a result, machine learning models 210 may perform a first round of scoring and ranking 234 and/or filtering of the candidates using a first of criteria, and machine learning models 212 may perform a second round of scoring and ranking 234 of a smaller number of candidates using a second set of criteria. The number of candidates scored by machine learning models 212 may be selected to accommodate performance and/or scalability constraints associated with generating results 232 in response to searches received through search apparatus 206.

Search apparatus 206 then uses scores 226-228 and/or rankings 234-236 from scoring apparatus 208 to generate search results 232 that are displayed and/or outputted in response to the corresponding search parameters 230. For example, search apparatus 206 may paginate some or all candidates in ranking 236 into subsets of search results 232 that are displayed as the recruiter scrolls through the search results 232 and/or navigates across screens or pages containing the search results 232.

In one or more embodiments, the system of FIG. 2 includes functionality to generate search results 232 that are ordered to reflect the levels of activity of candidates with respect to interaction with recruiters and/or the platform, in lieu of or in addition to search results 232 that order the candidates by relevance to parameters 230. In particular, scoring apparatus 208 inputs candidate activity features 224 for the candidates into a machine learning model (e.g., machine learning models 210-212) that generates scores (e.g., scores 226-228) representing measures of the candidates' "activeness" on the platform. For example, scoring apparatus 208 may apply the machine learning model to a categorical feature representing each candidate's number of visits to the platform over a given period; one or more features representing the number of recruiter messages received and/or accepted by the candidate; and/or one or more features representing the candidate's level of job-seeking interest, openness to new opportunities, and/or online status with the platform. In turn, the machine learning model may generate an activeness score that predicts the candidate's responsiveness to messages from recruiters and/or another attribute of the candidate with respect to activity on the platform.

Scoring apparatus 208 may input the activeness scores into another machine learning model with additional features to produce a set of overall relevance scores for the candidates, and a ranking (e.g., rankings 234-236) of the candidates by the relevance scores may be generated. The ranking may then be used to select a subset of the candidates for additional scoring and/or ranking by one or more additional machine learning models, or a number of highest-ranked candidates in the ranking may be displayed in search results 232 by search apparatus 206.

Scoring apparatus 208 may also, or instead, select a highest-ranked subset of candidates from a ranking of the candidates by relevance scores produced by another machine learning model (e.g., machine learning models 210). Scoring apparatus 208 may use the machine learning model to calculate activeness scores for the selected candidates and rank the candidates by descending activeness score. The ranking of candidates by activeness score may then be displayed as search results 232 in search apparatus

206, in lieu of or in addition to rankings of candidates by other sets of scores (e.g., relevance scores). The ranking of candidates by activeness score may also, or instead, be used to select a smaller subset of candidates for additional scoring and/or ranking by one or more additional machine learning models.

Search apparatus 206 and/or another component may additionally include functionality to output multiple sets of search results 232 based on different rankings 234-236 of candidates by scores 226-228. For example, search apparatus 206 may output, in response to parameters 230 of a search by a recruiter, a first set of search results 232 that includes a "default" ranking of candidates by relevance scores. Search apparatus 206 may also provide one or more user-interface elements that allow the recruiter to switch between the default ranking and a second set of search results containing an "activeness" ranking of the candidates by the activeness scores. Search apparatus 206 may also, or instead, output a third set of search results containing a "blended" ranking that orders the candidates by a weighted combination of the relevance scores and activeness scores. As a result, the system of FIG. 2 may allow the recruiter to switch between different sets of search results, depending on the recruiter's preferences and/or objectives with respect to a given opportunity or set of opportunities.

By generating scores (e.g., scores 226-228) that characterize the level of activity and/or responsiveness of candidates to moderators of jobs or opportunities and delivering search results (e.g., results 232) and/or rankings (e.g., rankings 234-236) of the candidates based on the scores, the system of FIG. 2 allows the moderators to identify and engage with active and/or interested candidates instead of dormant and/or uninterested candidates. In turn, the system of FIG. 2 may expedite job seeking by the candidates and/or placement of jobs or opportunities by moderators of the opportunities. In contrast, conventional techniques may generate rankings and/or search results of candidates without considering the candidates' level of job-seeking activity or interest. Instead, the moderators may be matched to candidates that are inactive and/or candidates that are not interested in new opportunities, resulting in additional overhead and/or suboptimal user experiences for both the moderators and candidates. Consequently, the disclosed embodiments may improve computer systems, applications, user experiences, tools, and/or technologies related to generating search results, user recommendations, employment, recruiting, and/or hiring.

Those skilled in the art will appreciate that the system of FIG. 2 may be implemented in a variety of ways. First, feature-processing apparatus 204, scoring apparatus 208, search apparatus 206, and/or data repository 134 may be provided by a single physical machine, multiple computer systems, one or more virtual machines, a grid, one or more databases, one or more filesystems, and/or a cloud computing system. Feature-processing apparatus 204, scoring apparatus 208, and search apparatus 206 may additionally be implemented together and/or separately by one or more hardware and/or software components and/or layers.

Second, a number of machine learning models and/or techniques may be used to generate scores 226-228 and/or rankings 234-236. For example, the functionality of each machine learning model may be provided by a regression model, artificial neural network, support vector machine, decision tree, random forest, gradient boosted tree, naïve Bayes classifier, Bayesian network, clustering technique, collaborative filtering technique, deep learning model, hierarchical model, and/or ensemble model. The retraining or execution of each machine learning model may also be performed on an offline, online, and/or on-demand basis to accommodate requirements or limitations associated with the processing, performance, or scalability of the system and/or the availability of features used to train the machine learning model. Multiple versions of a machine learning model may further be adapted to different subsets of candidates, recruiters, and/or search parameters 230 (e.g., different member segments), or the same machine learning model may be used to generate one or more sets of scores (e.g., scores 226-228) for all candidates and/or recruiters in the platform. Similarly, the functionality of machine learning models 210-212 may be merged into a single machine learning model that performs a single round of scoring and ranking of the candidates and/or separated out into more than two machine learning models that perform multiple rounds of scoring, filtering, and/or ranking of the candidates.

Third, the system of FIG. 2 may be adapted to generate search results 232 for various types of searches and/or entities. For example, the functionality of the system may be used to improve and/or personalize search results containing candidates for academic positions, artistic or musical roles, school admissions, fellowships, scholarships, competitions, club or group memberships, matchmaking, and/or other types of opportunities.

Figure 3:
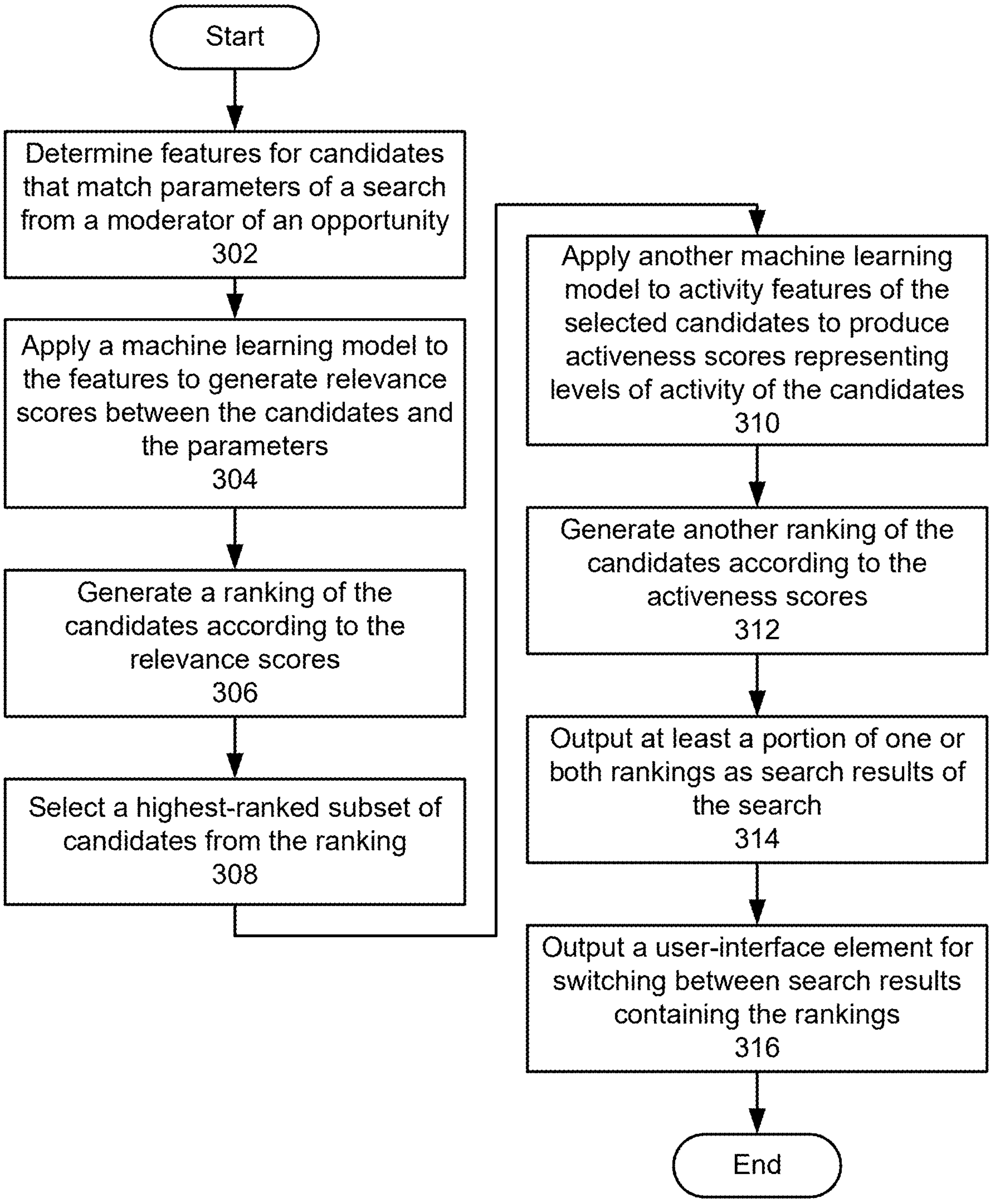
FIG. 3 shows a flowchart illustrating the processing of data in accordance with the disclosed embodiments.

FIG. 3 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, features for candidates that match parameters of a search from a moderator for an opportunity are determined (operation 302). The features may include, but are not limited to, a match between an attribute of each candidate and the parameters, a reputation score for a skill of the candidate, and/or another representation of the candidate's qualifications for the opportunity. The parameters may include, but are not limited to, a title, skill, industry, location, seniority, educational background, company, and/or keyword.

Next, a machine learning model is applied to the features to generate relevance scores between the candidates and the parameters (operation 304). For example, a tree-based model, regression model, deep learning model, and/or another type of model may be used to calculate, from features for each candidate, a relevance score that represents the likelihood of a positive outcome between the candidate and the moderator (or opportunity) and/or the extent to which the candidate is qualified for the opportunity.

A ranking of the candidates according to the relevance scores is generated (operation 306), and a highest-ranked subset of candidates is selected from the ranking (operation 308). For example, the candidates may be ranked by descending relevance scores, and a pre-specified number of candidates with the highest relevance scores may be selected from the ranking.

Another machine learning model is applied to activity features for the highest-ranked subset of candidates to produce activeness scores representing levels of activity of the candidates (operation 310) with respect to a platform (e.g., online network, recruiting tool, employment website, job search tool, etc.) used to conduct interaction between the candidate and the moderators. For example, the activity features may be determined with other candidate features in operation 302, or the activity features may be generated separately from the other candidate features. The activity features may include an amount of interaction between a candidate and moderators, which may be represented by a number of messages from the moderators to the candidate and/or a number of messages accepted by the candidate. The activity features may also, or instead, include a frequency of visits by the candidate to the platform, which may be represented by a category representing the candidate's number of visits to the platform over a given period (e.g., a week, a number of weeks, a month, etc.). The activity features may also, or instead, include a status of the candidate, such as an online status that indicates whether or not the candidate is currently visiting the platform, a job-seeking status that indicates the candidate's level of job-seeking interest, and/or an "open candidate" status that indicates the candidate's openness to new opportunities. The activity features may be inputted into a regression model, and activeness scores outputted by the model may characterize the candidates' overall level of activity and/or predict the candidates' receptiveness to interaction with moderators.

Another ranking of the candidates is generated according to the activeness scores (operation 312), and at least a portion of one or both rankings is outputted as search results of the search (operation 314). For example, the ranking of candidates by relevance scores may be outputted as one set of search results, and the ranking of candidates by activeness scores may be outputted as another set of search results. A user-interface element for switching between search results containing the rankings is additionally outputted (operation 316). For example, the user-interface element may include a toggle, one or more checkboxes, and/or one or more radio buttons that allow the moderator to select one or both rankings for inclusion in the outputted search results.

Figure 4:
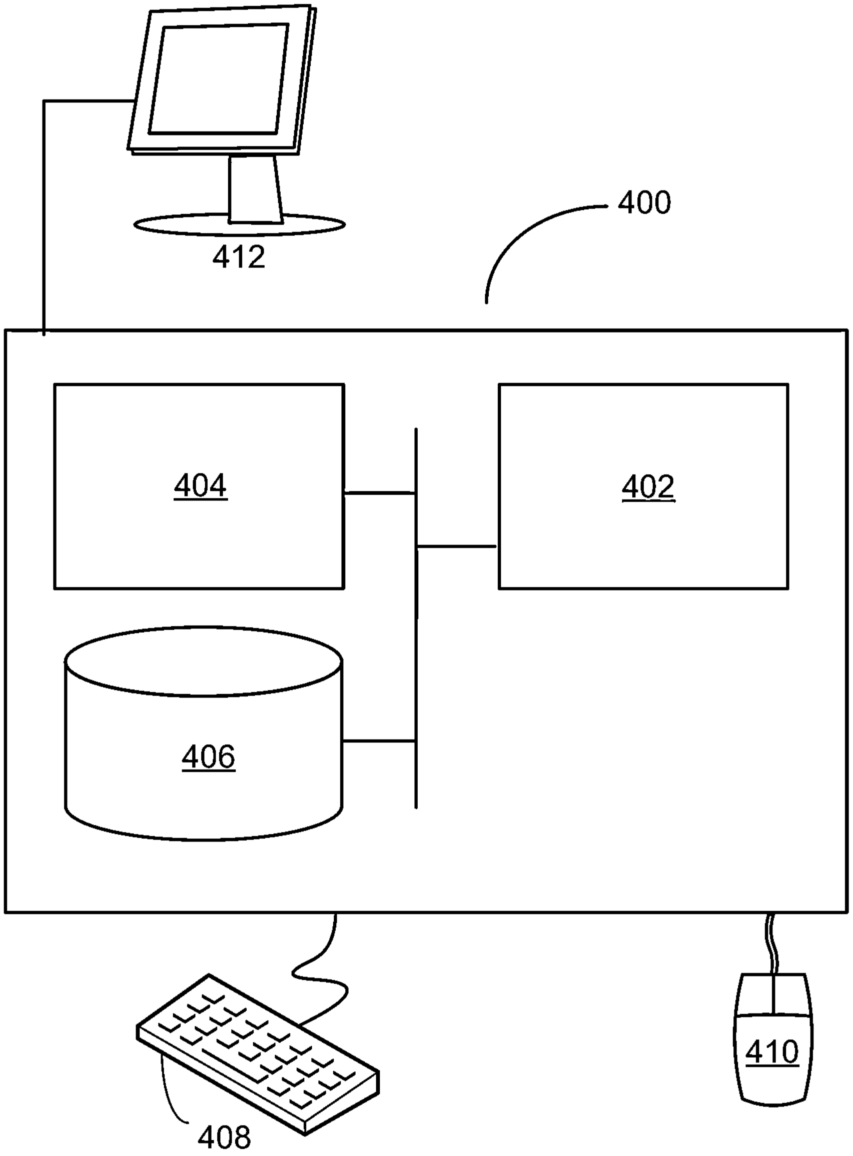
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for processing data. The system includes a feature-processing apparatus, a scoring apparatus, and a search apparatus, one or more of which may alternatively be termed or implemented as a module, mechanism, or other type of system component. The feature-processing apparatus determines activity features for candidates that match parameters of a search from a moderator of an opportunity. For example, the feature-processing apparatus may obtain and/or determine an amount of interaction between a candidate and additional moderators and/or a frequency of visits by the candidate to a platform used to conduct the interaction between the candidate and the additional moderators. Next, the scoring apparatus applies a machine learning model to the activity features to produce activeness scores representing levels of activity of the candidates with respect to the platform. The scoring apparatus then generates a ranking of the candidates according to the activeness scores. Finally, the search apparatus outputs at least a portion of the ranking as a set of search results of the search.

In addition, one or more components of computer system 400 may be remotely located and connected to the other components over a network. Portions of the present embodiments (e.g., feature-processing apparatus, scoring apparatus, search apparatus, data repository, online network, etc.) may also be located on different nodes of a distributed system that implements the embodiments. For example, the present embodiments may be implemented using a cloud computing system that generates candidate search results for searches performed by a set of remote moderators.

By configuring privacy controls or settings as they desire, members of a social network, a professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method comprising:

identifying, by a processing circuit, a set of candidate identifiers having profiles hosted by an online service with profile attributes that match search parameters of a search query;

determining, by the processing circuit, activity features for each of the set of candidate identifiers, wherein the activity features include an interaction level corresponding to one of the set of candidate identifiers and the online service;

tracking, by the processing circuit, profile events associated with the set of candidate identifiers and storing profile event data corresponding to the tracked profile events in a database, wherein the profile events include at least entity interaction data representing interactions with the online service;

applying, by the processing circuit, a first machine learned model, trained on the profile event data, to profile attributes associated with the set of candidate identifiers to produce relevance scores corresponding to a measure of relevance for each of the set of candidate identifiers based on the profile attributes;

generating, by the processing circuit, a first ranking of the set of candidate identifiers based on the corresponding relevance score of the set of candidate identifiers;

applying, by the processing circuit, a second machine learned model to the activity features to produce activity scores corresponding to levels of activity of candidates corresponding to the set of candidate identifiers with respect to the online service;

generating, by the processing circuit, a second ranking of the set of candidate identifiers based on the corresponding activity score of the set of candidate identifiers with respect to the online service; and presenting, by the processing circuit, a user interface element that when activated causes the user interface to switch between display of at least a portion of the first ranking of the set of candidate identifiers and at least a portion of the second ranking of the set of candidate identifiers.

2. The method of claim 1, wherein the search query includes input search parameters to define the search query; and wherein the entity interaction data includes data regarding at least searches, clicks, or other entity interaction with the online service.

3. The method of claim 2, wherein the input search parameters include attributes of a potential candidate that are desired or required for a given opportunity; and wherein the input search parameters comprise at least one of: a title, a skill, an industry, a location, a seniority, an educational background, a company, a keyword, thresholds, values or ranges of values, a current position, a publication, a certification, and a license.

4. The method of claim 1, wherein the activity features include views, searches, or applications executed by each of the candidates corresponding to the set of candidate identifiers.

5. The method of claim 1, wherein the second machine learned model is applied only to a subset of the first ranking, the subset including a predefined number of highest ranked candidate identifiers from the set of candidate identifiers.

6. The method of claim 5, wherein, before the second machine learned model is applied, the method further includes narrowing the one or more candidate list by applying a filter to the one or more candidate list based on additional input search parameters or candidate activity features.

7. The method of claim 1, wherein the profile attributes and activity features associated with each of the set of candidate identifiers are gathered from the profiles over a configurable time window to prevent the relevance scores, activity scores, first ranking, and second ranking from changing too frequently.

8. The method of claim 1, wherein the interaction level is based on an amount of historical interaction between a profile associated with a candidate identifier of the set of candidate identifiers and one or more moderators of corresponding opportunities.

9. The method of claim 8, wherein the amount of historical interaction includes a number of times the one or more moderators sent the profile a message and the profile sent a reply to the message.

10. An apparatus comprising:

a processing circuit;

memory storing executable instructions thereon, which when execute by the processing circuit, causes the apparatus to:

identify a set of candidate identifiers having profiles hosted by an online service with profile attributes that match search parameters of a search query;

determine activity features for each of the set of candidate identifiers, wherein the activity features include an interaction level corresponding to one of the set of candidate identifiers and the online service;

track profile events associated with the set of candidate identifiers and storing profile event data corresponding to the tracked profile events in a database, wherein the profile events include at least entity interaction data representing interactions with the online service;

apply a first machine learned model, trained on the profile event data, to profile attributes associated with the set of candidate identifiers to produce relevance scores corresponding to a measure of relevance for each of the set of candidate identifiers based on the profile attributes;

generate a first ranking of the set of candidate identifiers based on the corresponding relevance score of the set of candidate identifiers;

apply a second machine learned model to the activity features to produce activity scores corresponding to levels of activity of candidates corresponding to the set of candidate identifiers with respect to the online service;

generate a second ranking of the set of candidate identifiers based on the corresponding activity score of the set of candidate identifiers with respect to the online service; and present a user interface element that when activated causes a user interface to switch between display of at least a portion of the first ranking of the set of candidate identifiers and at least a portion of the second ranking of the set of candidate identifiers.

11. The apparatus of claim 10, wherein the search query includes input search parameters to define the search query; and wherein the entity interaction data includes data regarding at least searches, clicks, or other entity interaction with the online service.

12. The apparatus of claim 11, wherein the input search parameters include attributes of a potential candidate that are desired or required for a given opportunity; and wherein the input search parameters comprise at least one of: a title, a skill, an industry, a location, a seniority, an educational background, a company, a keyword, thresholds, values or ranges of values, a current position, a publication, a certification, and a license.

13. The apparatus of claim 10, wherein the activity features include views, searches, or applications executed by each of the candidates corresponding to the set of candidate identifiers.

14. The apparatus of claim 10, wherein the second machine learned model is applied only to a subset of the first ranking, the subset including a predefined number of highest ranked candidate identifiers from the set of candidate identifiers.

15. The apparatus of claim 14, wherein, before the second machine learned model is applied, the processing circuit is further caused to narrow the one or more candidate list by applying a filter to the one or more candidate list based on additional input search parameters or candidate activity features.

16. The apparatus of claim 10, wherein the profile attributes and activity features of each of the candidates corresponding to the set of candidate identifiers are gathered from the profiles over a configurable time window to prevent the relevance scores, activity scores, first ranking, and second ranking from changing too frequently.

17. The apparatus of claim 10, wherein the interaction level is based on an amount of historical interaction between a profile associated with a candidate identifier of the set of candidate identifiers and one or more moderators of corresponding opportunities.

18. The apparatus of claim 10, wherein the amount of historical interaction includes a number of times the one or more moderators sent the profile a message and the profile sent a reply to the message.

19. A non-transitory computer-readable storage medium having instructions stored thereon, which when executed by a processing circuit of an apparatus cause the apparatus to:

identify a set of candidate identifiers having profiles hosted by an online service with profile attributes that satisfy search parameters of a search query;

determine activity features for each of the set of candidate identifiers, wherein the activity features include an interaction level between a candidate corresponding to one of the set of candidate identifiers and the online service;

track profile events associated with the set of candidate identifiers and storing profile event data corresponding to the tracked profile events in a database, wherein the profile events include at least entity interaction data representing interactions with the online service;

apply a first machine learned model, trained on the profile event data, to profile attributes associated with the set of candidate identifiers to produce relevance scores corresponding to a measure of relevance for each of the set of candidate identifiers based on the profile attributes associated with the set of candidate identifiers;

generate a first ranking of the set of candidate identifiers based on the corresponding relevance score of the set of candidate identifiers;

apply a second machine learned model to the activity features to produce activity scores corresponding to levels of activity of candidates corresponding to the set of candidate identifiers with respect to the online service;

generate a second ranking of the set of candidate identifiers based on the corresponding activity score of the set of candidate identifiers with respect to the online service; and output, to a user interface, a user interface element, which when interacted with, causes the user interface to switch between display of at least a portion of the first ranking of the set of candidate identifiers and at least a portion of the second ranking of the set of candidate identifiers.

20. The non-transitory computer-readable storage medium of claim 19, wherein the search query includes input search parameters to define the search query;

wherein the input search parameters include attributes of a potential candidate that are desired or required for a given opportunity; and wherein the input search parameters comprise at least one of: a title, a skill, an industry, a location, a seniority, an educational background, a company, a keyword, thresholds, values or ranges of values, a current position, a publication, a certification, and a license.

* * * * *